United States Patent [19]

Wernli

[11] 3,767,978

[45] Oct. 23, 1973

[54] VOLTAGE-ISOLATING, KEYING ARRANGEMENT FOR A POWER-LINE CARRIER SYSTEM

[76] Inventor: Andreas Wernli, Charlottesville, Va.

[22] Filed: Mar. 17, 1972

[21] Appl. No.: 235,595

[52] U.S. Cl. .................. 317/124, 250/338, 307/311, 323/21

[51] Int. Cl. .......................................... H01h 47/24

[58] Field of Search ................. 323/21, 8; 317/28 R, 317/124; 250/83.3 H, 211 J; 307/311; 280/338

[56] References Cited

UNITED STATES PATENTS

| | | | |
|---|---|---|---|
| 3,535,613 | 10/1970 | Katzenstein | 323/8 |
| 3,626,276 | 12/1971 | McGill, Jr. et al. | 323/21 X |
| 3,359,483 | 12/1967 | Biard | 323/21 |
| 3,418,480 | 12/1968 | Miller | 323/21 |
| 3,293,513 | 12/1966 | Biard et al. | 250/211 J |
| 3,636,354 | 1/1972 | Leheny et al. | 250/83.3 H |
| 2,806,184 | 9/1957 | Carter | 317/28 R |
| 3,590,324 | 6/1971 | Rockfeller, Jr. | 317/28 R |
| 3,410,961 | 11/1968 | Slana | 307/311 X |

OTHER PUBLICATIONS

Electronics Nov. 23, 1970; Vol. 43, No. 24; page 68 relied upon.

*Primary Examiner*—Gerald Goldberg
*Attorney*—James J. Williams et al.

[57] ABSTRACT

In a power-line carrier system, a keying input circuit is isolated from its corresponding keying output circuit by a light-emitting diode which produces light in response to keying signals, and by a light-sensing transistor which supplies output signals in response to light from the light-emitting diode.

5 Claims, 2 Drawing Figures

VOLTAGE-ISOLATING, KEYING ARRANGEMENT FOR A POWER-LINE CARRIER SYSTEM

BACKGROUND OF THE INVENTION

My invention relates to a keying arrangement for a power-line carrier system, and particularly to such a keying arrangement in which the keying input circuit is voltage-isolated from the keying output circuit.

Power-line carrier systems are used with electrical power transmission systems to provide voice communication, data and information signals, and function signals between locations on the power transmission systems. Such powerline carrier systems are used extensively because they are carried by the power lines which are located where the power companies need the carrier systems, namely along the power line, especially at isolated and remote locations not served by any other means of communication. Power-line carrier systems are also used extensively because the power transmission lines are rugged, and hence reliable under extremely adverse conditions. The function signals used by the power company may have various purposes. For example, the magnitude of electrical current supplied by a power substation for distribution may have to be known at a central generating and dispatching station to indicate that a power line should be taken out of service to protect the power-generating equipment, or that a power line should be put into service to satisfy additional demands. The magnitude of current is frequently indicated by a keying circuit which uses a magnetic relay that is coupled to the power substation equipment over a coupling line. This coupling line may be accidentally subjected to a directly connected or an induced voltage, and such a voltage can cause erroneous operation of the keying circuit, or present a hazard to personnel and equipment. In addition, the supply voltage for one part of the keying circuit may have to be isolated from the supply voltage for the remainder of the keying circuit or for the power line carrier system.

Accordingly, a primary object of my invention is to provide a new and improved power-line carrier keying circuit having a keying signal input that is isolated from the remainder of the keying circuit.

Another object of my invention is to provide a new and improved power-line carrier keying circuit having its input circuit isolated from its output circuit by a reliable, voltage-isolated arrangement.

Another and more specific object of my invention is to provide a new and improved power-line carrier keying circuit that replaces a magnetic relay with a light-beam coupling circuit that provides better voltage isolation and faster operation.

SUMMARY OF THE INVENTION

Briefly, these and other objects are achieved in accordance with my invention by a light-emitting diode. The diode is connected in an input circuit with its own power supply so as to produce light, preferably in the infrared region, in response to function keying signals. A light-sensing transistor is spaced from and positioned to receive light from the diode. The transistor is connected in an output circuit with its own power supply to produce output utilization signals in response to the light. The diode and transistor are voltage-insulated from each other, so that separate power supplies can be used for the input and output keying circuits, and so that the output circuit and subsequent power-line carrier circuits are protected from any voltages which may be applied to the light-emitting diode and its associated keying input circuit.

BRIEF DESCRIPTION OF THE DRAWING

The subject matter which I regard as my invention is particularly pointed out and distinctly claimed in the Claims. The structure and operation of my invention, together with further objects and advantages, may be better understood from the following description given in connection with the accompanying drawing, in which:

DESCRIPTION OF THE PREFERRED EMBODIMENT

Figure 1:
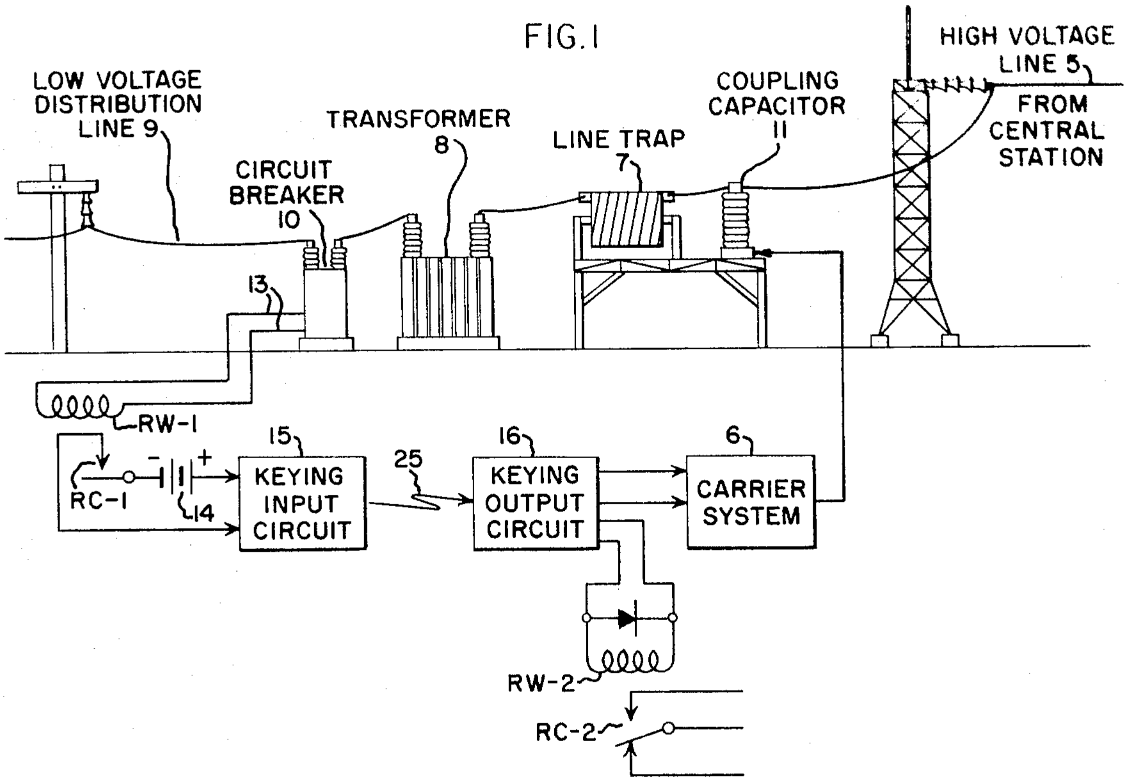
FIG. 1 shows an example of an electrical power substation, and also shows a block diagram of a keying arrangement in accordance with my invention as used at the substation with a power-line carrier system.

As one example of a practical application of my keying arrangement, I have shown, in FIG. 1, an electrical power substation. This substation receives high-voltage, 60 Hertz electrical power from a central-station generator (not shown) over a high-voltage line 5. Typically, such a line supplies three-phase power. In order to provide communication between the substation and the central station, I have assumed that a power-line carrier system 6 is operated over the high-voltage line 5. This system 6 can operate over one phase wire to ground, or can operate between two phase wires. Each wire used is serially connected through a respective inductive line trap 7 to the primary side of a substation transformer 8 which reduces the relatively high voltage to a lower voltage (at its secondary) for distribution over a low voltage line 9 to customers or other transformers or substations. This low-voltage distribution line 9 may be single-phase or three-phase, and is usually connected to the transformer 8 through a protective circuit breaker 10. As known in the art, the power line carrier system 6 uses a carrier frequency (in the kilohertz range) to provide one or more communication channels. This carrier frequency is connected to the high-voltage line 5 through a coupling capacitor 11. The coupling capacitor 11 is connected to the high-voltage line 5 on the side of the line trap 7 toward which the carrier signals are directed. The line trap 7 presents a relatively low impedance to the 60 Hertz power and a relatively low impedance to the carrier frequency. The coupling capacitor 11 presents a relatively low impedance to the carrier frequency and a relatively high impedance to the 60 Hertz power. Thus, proper isolation is provided. The central station at the remote end of the high-voltage line 5 is provided with a similar power-line carrier system. At the central station, it may be desirable to provide an indication of some condition at the substation. One indication that should be provided is the magnitude of current that the transformer 8 is supplying to the low-voltage distribution line 9. Thus, a dispatcher can decide whether additional high-voltage lines are needed to provide power, or whether the high-voltage line 5 should be taken out of service to protect the power-generating equipment. There are various devices for determining the current supplied by the transformer 8 to the low-voltage line 9. Such devices may include a current transformer (not shown) connected or coupled to the line 9 at the circuit breaker 10. In most cases, this current transformer is located an appreciable distance from the keying circuit and carrier system where an indication is needed. Thus, a coupling line 13 is provided to connect the current transformer or other indicating device to the keying circuit and carrier system. This coupling line 13 must often be located where it is exposed to induced high voltage surges, or, under unusual circumstances, to direct contact by a broken high voltage wire. The line 13 is coupled to a relay winding RW-1 which may have an associated set of normally open contacts RC-1. The contacts RC-1 are connected in a series circuit with a battery 14, and the series circuit is connected to a keying input circuit 15. The battery 14 may supply power over lines to other equipment at the substation, and these lines, as well as the series circuit, are also exposed to high voltages, adding to the need for voltage isolation. In accordance with my invention, the keying input circuit 15 is coupled over a light path 25 to a keying output circuit 16. The keying output circuit 16 has its output directly connected to the carrier system 6 for rapid operation, and may also have an output relay winding RW-2 and associated contacts RC-2 to provide additional functions if desired. With the exception of my coupling circuit, the circuit described thus far is known in the art. In the event that the transformer 8 supplies a current whose magnitude exceeds a selected level, the relay winding RW-1 is energized so as to close the contacts RC-1. This supplies voltage from the battery 14 to the keying input circuit 15 which, in turn, causes the keying output circuit 16 to provide a fault or other keying signal to the power-line carrier system 6. This signal is supplied by the carrier system 6 through the coupling capacitor 11 and the high-voltage line 5 to the central station to provide an indication that a fault or undesired condition exists at the substation. As mentioned, it is desirable that reliable voltage isolation be provided at some point in the keying circuits 15, 16, so that protection is provided to the equipment in the carrier system 6, and so that the various parts of the keying circuits 15, 16 and the carrier system 6 can have their own isolated or floating battery supplies. In accordance with my invention, I have separated the keying input circuit 15 from the keying output circuit 16, but have coupled the circuits 15, 16 together through light-emitting and light-sensitive devices. An electrical circuit of my keying input circuit 15 and my keying output circuit 16 is shown in FIG. 2.

Figure 2:
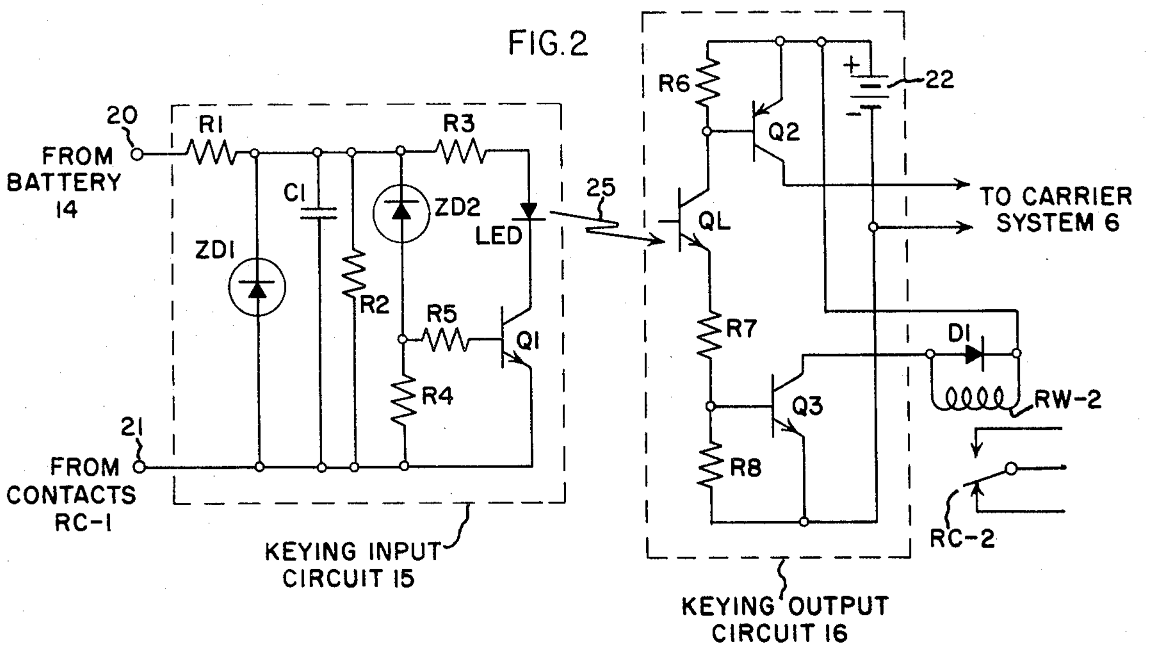
FIG. 2 shows an electrical circuit of a preferred embodiment of a keying arrangement in accordance with my invention.

In FIG. 2, the input circuit 15 has input terminals 20, 21 which are respectively connected to the positive terminal of the battery 14 and the relay contacts RC-1. The terminal 20 is connected to one side of an input resistor R1. The other side of the resistor R1 is connected through a voltage breakdown or zener diode ZD1 to the terminal 21. A capacitor C1 and a resistor R2 are connected in parallel with the diode ZD1. A voltage threshhold circuit, comprising a series zener diode ZD2 and resistor R4, is also connected in parallel with the diode ZD1. The other side of the resistor R1 is connected through a series circuit comprising a resistor R3, a light-emitting diode LED, and the collector-emitter path of an NPN transistor Q1. The emitter of the transistor Q1 is connected to the terminal 21. The base of the transistor Q1 is connected through a resistor R5 to the threshold circuit at the junction of the diode ZD2 and the resistor R4. In the keying input circuit 15, when the relay contacts RC-1 are closed, negative voltage from the battery 14 is applied to the terminal 21. If this voltage is sufficient, the zener diode ZD2 conducts current and turns the transistor Q1 on. This causes current to flow through the light-emitting diode LED, which emits light in some portion of the light spectrum.

The keying input circuit 15 is coupled to the keying output circuit 16 by light which travels from the light-emitting diode LED to a light-sensing transistor QL, as indicated by the arrow 25. The light-sensing transistor QL has its collector connected through a resistor R6 to the positive terminal of a battery 22, and its emitter connected through two series resistors R7, R8 to the negative terminal of the battery 22. A PNP transistor Q2 has its emitter connected to the positive terminal of the battery 22 and its base connected to the collector of the light-sensing transistor QL. The collector of the transistor Q2 and the negative terminal of the battery 22 are connected to the carrier system 6. When the intensity of light reaching the base of the transistor QL is sufficient, the transistor QL conducts and lowers the voltage at its collector and at the base of the transistor Q2. This causes the transistor Q2 to conduct and supply a signal from the battery 22 to the carrier system 6. The system 6 provides an indication back to the central station in response to this signal, and this indication is used as desired. To provide further functions or indications, I also use an NPN transistor Q3. The base of the transistor Q3 is connected to the junction of the resistors R7, R8, the emitter is connected to the negative terminal of the battery 22, and the collector is connected through the relay winding RW-2 to the positive terminal of the battery 22. A free-wheeling or current-circulating diode D1 is preferably connected in parallel with the relay winding RW-2. When the transistor QL conducts, it causes the transistor Q3 to turn on or conduct. Conduction of the transistor Q3 energizes the relay winding RW-2 so that its associated contacts RC-2 operate. As an example, this operation has been shown to cause a movable contact to switch from one fixed contact to another fixed contact and thereby provide an additional signal or function.

A circuit similar to that shown in FIG. 2 has been constructed and operated with components having the following values:

| Component | Value |
|---|---|
| Battery 14 | 48 volts |
| Battery 22 | 36 volts |
| R1 | 310 ohms |
| R2 | 128 ohms |
| R3 | 232 ohms |
| R4 | 316 ohms |
| R5 | 1,000 ohms |
| R6 | 19,600 ohms |
| R7 | 5,110 ohms |
| R8 | 19,600 ohms |
| C1 | 0.1 microfarad |
| Zener Diode ZD1 | Type 1N3022A, 12 volts |
| Zener Diode ZD2 | Type 1N753A, 6.2 volts |
| Light-Emitting Diode LED | Type SSL-5C |
| Transistor Q1 | Type 2N3053 |
| Transistor Q2 | Type 2N2800 |
| Light-Sensing Transistor QL | Type L14A502 |
| Transistor Q3 | Type 2N3053 |
| Diode DL | Type 1N645 |

The light-emitting diode LED, and the light-sensing transistor QL were both most sensitive in the infrared region in the vicinity of 9,000 Angstroms. The input circuit 15 and the output circuit 16 were separately contained, and were coupled through a light transmission medium which excluded extraneous light, so as to prevent false operation. This was provided through the use of a plastic cylinder in which the diode LED was positioned at one end, and oriented so that it directed infrared light toward the light-sensing base of the transistor QL at the other end. The actual separation was in the order of 0.3 inch, which gave a voltage isolation of approximately 5,000 volts. In addition, the zener diode ZD1 provided some degree of protection in that if a voltage surge was received at the terminals 20, 21, this diode ZD1 short-circuited the voltage and provided isolation and protection to the remainder of the keying circuit.

It will thus be seen that I have provided a new and improved voltage-isolating circuit for use in keying circuits in power-line carrier systems. My circuit has many advantages over prior-art circuits which utilized relays, in that a reliable voltage isolation was provided through the light-coupling circuit, and in that the light-coupling circuit is relatively rapid and reliable in operation. While I have shown my invention with a specific circuit having particular components, it is to be understood that other values of components may be used, depending upon the specific application for the keying circuit. Therefore, despite the description with reference to a particular embodiment, it is to be understood that modifications may be made without departing from the spirit of the invention or from the scope of the claims.

What I claim as new and desire to secure by U. S. Letters Patent is:

1. An improved power line carrier keying arrangement comprising:

a. relaying means having input and output terminals, said input terminals being adapted to be connected to a power system for receiving an indication of a selected condition in said power system, and said output temrinals producing keying signals in response to said selected condition;

b. a keying input circuit comprising:

1. first and second input terminals;
2. means connecting said first and second input terminals to said relaying means output terminals;
3. a voltage breakdown circuit including a first resistor connected between said first input terminal and a first junction, and a first zener diode connected between said first junction and said second input terminal;
4. a capacitor connected in parallel with said first zener diode;
5. a second resistor connected in parallel with said capacitor;
6. a voltage threshold circuit including a second zener diode and a third resistor connected in a first series circuit between said first junction and said second input terminal;
7. a fourth resistor;
8. a light-emitting diode;
9. a transistor having an emitter, a collector, and a base;
10. means connecting said transistor emitter and collector, said light-emitting diode and said fourth resistor in a second series circuit between said first junction and said second input terminal;
11. a fifth resistor;
12. means serially connecting said fifth resistor between said transistor base and a common connection of said second zener diode and said third resistor in said first series circuit for causing said second series circuit to conduct current in response to said keying signals causing said first series circuit to conduct current, thereby causing said light-emitting diode to emit light energy;

c. a keying output circuit comprising:

1. a first light-sensing transistor having an emitter, a collector, and a base;
2. power means connected to said light-sensing transistor emitter and collector for supplying an operating potential thereto;
3. a first resistor serially connected between said power means and said collector of said light-sensing transistor;
4. a second resistor serially connected between said emitter of said light-sensing transistor and a first output terminal of said keying output circuit;
5. a second transistor having an emitter, a collector, and a base;
6. means connecting said emitter of said second transistor to said power means, said collector of said second transistor being connected to a second output terminal of said keying output circuit;
7. means connecting said base of said second transistor to said collector of said first light-sensing transistor for supplying an output signal at said second output terminal of said keying output circuit in response to emitter collector current conduction of said light-sensing transistor;

d. and means positioning said keying input circuit and said keying output circuit in spaced relation so that said light-sensing transistor base can receive light produced by said light-emitting diode, and produce an output signal in response to light produced by said light-emitting diode.

2. The improved keying arrangement of claim 1 wherein said light-emitting diode emits light in the infrared region, and wherein said light-sensing transistor is sensitive to light in the infrared region.

3. The improved keying arrangement of claim 1 wherein said positioning means exclude light from other sources so that said base of said light-sensing transistor receives light only from said light-emitting diode.

4. The improved keying arrangement of claim 1 wherein said light-emitting diode emits light in the infrared region and wherein said light-sensing transistor is sensitive to light in the infrared region, and wherein said positioning means exclude light from other sources so that said base of said light-sensing transistor receives light only from said light-emitting diode.

5. The improved power line carrier keying arrangement of claim 1 wherein said second resistor in said keying output circuit comprises third and fourth serially connected resistors having a common junction and said keying output circuit includes a second output arrangement comprising:

a. a third transistor having an emitter, a collector, and a base;

b. means connecting said emitter of said third transistor to said first output terminal;

c. a relay winding serially connected between said collector and said third transistor and said power means; and d. means connecting said base of said third transistor to said common junction of said third and fourth resistors for causing conduction of said third transistor in response to emitter collector current conduction of said light-sensing transistor to thereby energize said relay winding.

* * * * *